US012584753B2

(12) United States Patent
Tamaki et al.

(10) Patent No.: US 12,584,753 B2
(45) Date of Patent: Mar. 24, 2026

(54) ROUTE GUIDANCE DEVICE, SYSTEM AND ROUTE GUIDANCE METHOD

(71) Applicant: HONDA MOTOR CO., LTD., Tokyo (JP)

(72) Inventors: Kazuma Tamaki, Wako (JP); Yuji Yasui, Wako (JP); Tokitomo Ariyoshi, Wako (JP); Hideki Matsunaga, Wako (JP); Ken Iinuma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 63 days.

(21) Appl. No.: 18/367,781

(22) Filed: Sep. 13, 2023

(65) Prior Publication Data

US 2024/0110794 A1 Apr. 4, 2024

(30) Foreign Application Priority Data

Sep. 29, 2022 (JP) ................................. 2022-156415

(51) Int. Cl.
*G01C 21/34* (2006.01)
*G01C 21/36* (2006.01)
(52) U.S. Cl.
CPC ..... *G01C 21/3423* (2013.01); *G01C 21/3461* (2013.01); *G01C 21/3492* (2013.01); *G01C 21/3694* (2013.01)
(58) Field of Classification Search
CPC ............ G01C 21/3423; G01C 21/3461; G01C 21/3492; G01C 21/3694; G01C 21/3407
See application file for complete search history.

(56) References Cited

U.S. PATENT DOCUMENTS 10,746,557 B1 * 8/2020 Lambert ............ G01C 21/3655
2019/0383622 A1 * 12/2019 Aich ...................... G06Q 10/02
(Continued)

FOREIGN PATENT DOCUMENTS

EP 4290181 B1 7/2025
JP 2016-156691 A 9/2016
(Continued)

OTHER PUBLICATIONS

Japanese Office Action for Japanese Patent Application No. 2022-156415 mailed Aug. 25, 2025 (partially translated).

*Primary Examiner* — Abdalla A Khaled
(74) *Attorney, Agent, or Firm* — THOMAS | HORSTEMEYER, LLP

(57) ABSTRACT

A route guidance device that guides a user along a movement route, the route guidance device including an acquisition unit configured to acquire, from a communication device, location information including a departure location and a destination location of the user, a search unit configured to search for a plurality of movement routes from the departure location to the destination location, based on the location information acquired by the acquisition unit, and a provision unit configured to provide the communication device with the plurality of movement routes searched for by the search unit, wherein the plurality of movement routes includes a first movement route using a first moving body of a riding type capable of traveling on a roadway, and a second movement route using a second moving body of a self-propelled type capable of traveling on a sidewalk.

15 Claims, 6 Drawing Sheets

(56)          References Cited

U.S. PATENT DOCUMENTS

| | | | | |
|---|---|---|---|---|
| 2020/0173796 | A1* | 6/2020 | Beaurepaire ....... | G01C 21/3415 |
| 2020/0272954 | A1* | 8/2020 | Serra ................... | G01C 21/343 |
| 2020/0300644 | A1* | 9/2020 | Tian ...................... | G06Q 50/40 |
| 2020/0408546 | A1* | 12/2020 | Vaughn .............. | G01C 21/3423 |
| 2021/0024146 | A1* | 1/2021 | Ohta ................. | B60W 60/0021 |
| 2021/0102812 | A1* | 4/2021 | Spielman ........... | G01C 21/3423 |
| 2021/0102815 | A1* | 4/2021 | Spielman ........... | G01C 21/3423 |
| 2021/0191424 | A1* | 6/2021 | Drayna ................... | G05D 1/69 |
| 2021/0223054 | A1* | 7/2021 | Fuchs ................ | G01C 21/3461 |
| 2021/0389137 | A1* | 12/2021 | Haban ................ | G01C 21/3438 |
| 2021/0404832 | A1* | 12/2021 | Baig .................. | G01C 21/3415 |
| 2022/0044344 | A1* | 2/2022 | Ramot .................. | G06Q 50/40 |
| 2022/0057219 | A1* | 2/2022 | Ha ...................... | G01C 21/3484 |
| 2022/0114655 | A1* | 4/2022 | Chen ................. | G06Q 30/0625 |
| 2022/0194504 | A1* | 6/2022 | Pellerey .................. | B62H 5/18 |
| 2022/0196412 | A1* | 6/2022 | Lee ................... | G01C 21/3626 |
| 2022/0268589 | A1* | 8/2022 | Nagata .............. | G01C 21/3697 |
| 2022/0290998 | A1* | 9/2022 | Chua .................. | G01C 21/3484 |
| 2022/0291684 | A1 | 9/2022 | Yoshimura et al. | |
| 2022/0381567 | A1* | 12/2022 | Spielman ........... | G06Q 30/0205 |

FOREIGN PATENT DOCUMENTS

| | | | |
|---|---|---|---|
| JP | 2020112519 | A | 7/2020 |
| JP | 2021022108 | A | 2/2021 |
| JP | 2022038302 | A | 3/2022 |
| JP | 2022097394 | A | 6/2022 |
| JP | 2022-139059 | A | 9/2022 |
| JP | 2023-177051 | A | 12/2023 |

* cited by examiner

400
COMMUNICATION
DEVICE

500
ROUTE GUIDANCE
DEVICE

REQUEST PROVISION OF
ROUTE GUIDANCE SERVICE
S101

ROUTE SEARCH ~ S102

PROVIDE MOVEMENT ROUTE
S103

ROUTE DISPLAY ~ S104

END

510

511
ACQUISITION UNIT

513
ARITHMETIC UNIT

SEARCH UNIT
512

PROVISION UNIT
514

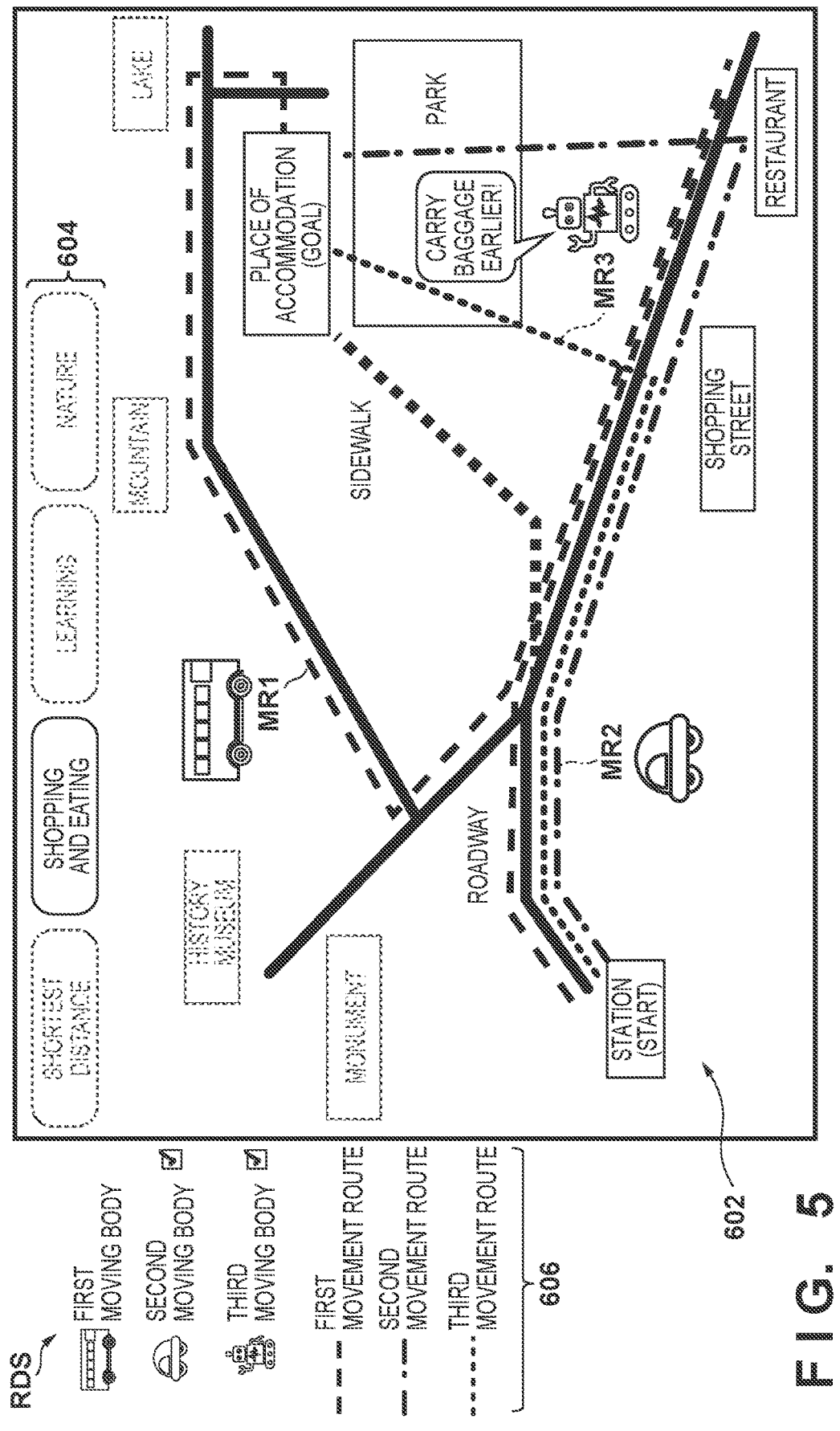
F I G. 5

ROUTE GUIDANCE DEVICE, SYSTEM AND ROUTE GUIDANCE METHOD

CROSS-REFERENCE TO RELATED APPLICATION(S)

This application claims priority to and the benefit of Japanese Patent Application No. 2022-156415 filed on Sep. 29, 2022, the entire disclosure of which is incorporated herein by reference.

BACKGROUND OF THE INVENTION

Field of the Invention

The present invention relates to a route guidance device, a system and a route guidance method.

Description of the Related Art

In these years, research and development are progressing in self-propelled vehicles (automated driving vehicles) having an automated driving function for traveling autonomously in an automated manner, without the need for a driver's driving operation. As such automated driving vehicles, for example, there are riding type vehicles, on each of which a small number of users (on the order of one or two persons) get in so as to travel to a destination location, so-called ultra-compact mobility vehicles (micro mobility vehicles). In addition, there are also non-riding type vehicles, so-called traveling support robots that can hold the user's baggage or lead the way to destination locations, although users are not allowed to get in.

Ultra-compact mobility vehicles and traveling support robots, in particular, the ultra-compact mobility vehicles are capable of passing not only on a roadway (a road for vehicles to pass on) but also on a sidewalk (a road for pedestrians to pass on), and are expected to be used as a convenient means of transportation in a region targeted for tourists and the like. In addition, in utilizing the ultra-compact mobility vehicles and the traveling support robots, it is conceivable to use them in combination with various services such as a route guidance service and a vehicle dispatch service through communication devices or the like owned by users. Note that techniques related to such services are proposed in Japanese Patent Laid-Open No. 2022-38302, Japanese Patent Laid-Open No. 2022-97394, Japanese Patent Laid-Open No. 2021-22108, and Japanese Patent Laid-Open No. 2020-112519.

The techniques disclosed in Japanese Patent Laid-Open No. 2022-38302, Japanese Patent Laid-Open No. 2022-97394, Japanese Patent Laid-Open No. 2021-22108, and Japanese Patent Laid-Open No. 2020-112519, however, are not techniques related to the ultra-compact mobility vehicles. Hence, there is a demand for a technique related to a new service for promoting the use of an ultra-compact mobility vehicle or the use of the ultra-compact mobility vehicle in combination with a traveling support robot. In particular, a technique related to a service that presents (provides) usefulness unique to the ultra-compact mobility vehicles to users is desired.

SUMMARY OF THE INVENTION

The present invention provides a new technique related to a route guidance device that guides a user along a movement route.

According to one aspect of the present invention, there is provided a route guidance device that guides a user along a movement route, the route guidance device including an acquisition unit configured to acquire, from a communication device, location information including a departure location and a destination location of the user, a search unit configured to search for a plurality of movement routes from the departure location to the destination location, based on the location information acquired by the acquisition unit, and a provision unit configured to provide the communication device with the plurality of movement routes searched for by the search unit, wherein the plurality of movement routes includes a first movement route using a first moving body of a riding type capable of traveling on a roadway, and a second movement route using a second moving body of a self-propelled type capable of traveling on a sidewalk.

According to another aspect of the present invention, there is provided a system including a route guidance device configured to guide a user along a movement route, and a communication device capable of communicating with the route guidance device, the system including an acquisition unit configured to acquire, from the communication device, location information including a departure location and a destination location of the user, a search unit configured to search for a plurality of movement routes from the departure location to the destination location, based on the location information acquired by the acquisition unit, and a provision unit configured to provide the communication device with the plurality of movement routes searched for by the search unit, wherein the plurality of movement routes includes a first movement route using a first moving body of a riding type capable of traveling on a roadway, and a second movement route using a second moving body of a self-propelled type capable of traveling on a sidewalk.

According to still another aspect of the present invention, there is provided a route guidance method for guiding a user along a movement route, the method including a first step of acquiring, from a communication device, location information including a departure location and a destination location of the user, a second step of searching for a plurality of movement routes from the departure location to the destination location, based on the location information acquired in the first step, and a third step of providing the communication device with the plurality of movement routes searched for in the second step, wherein the plurality of movement routes includes a first movement route using a first moving body of a riding type capable of traveling on a roadway, and a second movement route using a second moving body of a self-propelled type capable of traveling on a sidewalk.

Further objects or other aspects of the present invention will be clarified in embodiments to be described below with reference to the accompanying drawings.

BRIEF DESCRIPTION OF THE DRAWINGS

FIG. 5 is a diagram illustrating another specific example of the route display screen displayed on the communication device (the display unit) illustrated in FIG. 1.

DESCRIPTION OF THE EMBODIMENTS

Figure 1:
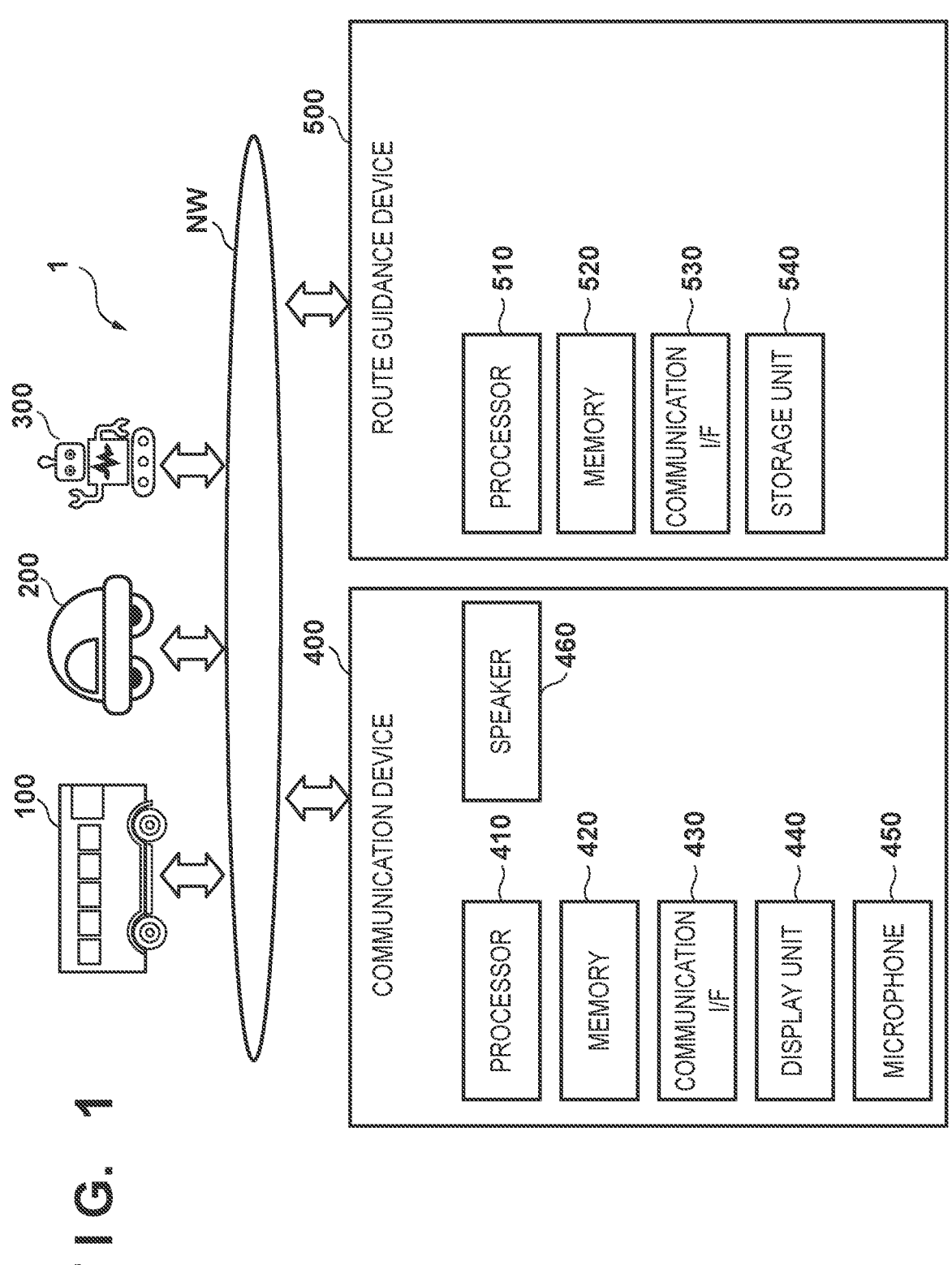
FIG. 1 is a schematic diagram illustrating a configuration of a system according to one aspect of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

FIG. 1 is a schematic diagram illustrating a configuration of a system 1 according to one aspect of the present invention. As illustrated in FIG. 1, the system 1 includes a public vehicle 100, a micro vehicle 200, a robot vehicle 300, a communication device 400 owned by a user, and a route guidance device 500, and provides a route guidance service. Here, the route guidance service is a service for guiding a user along a movement route from a departure location to a destination location.

In using the route guidance service provided by the system 1 (the route guidance device 500), a user installs an application, from which the user is able to obtain the route guidance service, in the communication device 400. In addition, the user registers information about the user (user information) in the route guidance device 500 on the application that has been installed in the communication device 400. Note that the application may be a web application running on a web browser. The route guidance device 500 manages, as the user information that has been registered by the user, identification information from which each user is identifiable, such as a user name or an e-mail address.

The public vehicle 100 is a vehicle that can be used by an unspecified number of users, that is, a vehicle that belongs to public transportation, and typically includes automobiles such as a rental car, a taxi, and a bus. The public vehicle 100 is a riding type vehicle (a first moving body) into which a user gets, and is capable of traveling on a roadway. The public vehicle 100 is not allowed to travel on a sidewalk, and is allowed to travel only on a roadway. Here, the roadway means a road intended for vehicles to pass on, and the sidewalk means a road intended for pedestrians to pass on. However, it is assumed that the sidewalk is a concept widely including areas through which pedestrians can pass, such as a large-sized commercial facility, an amusement facility, a park, and a parking lot.

The micro vehicle 200 is a self-propelled vehicle (an automated driving vehicle) having an automated driving function of traveling autonomously in an automated manner. In the present embodiment, the micro vehicle 200 is embodied as a riding type vehicle (a second moving body), a so-called ultra-compact mobility vehicle, into which a small number of users (one or two persons) get, and which is allowed to travel on a roadway and a sidewalk. Note that regarding the traveling of the micro vehicle 200, it is assumed to travel with the automated driving that does not necessitate a driver's (user's) driving operation. However, after the user gets in the micro vehicle 200, there is no intention of excluding the user's driving operation. In addition, the riding type vehicles do not mean any vehicle that necessitates a person (a user) to get in, but means vehicles into which persons are able to get. Therefore, the micro vehicle 200, which is a riding type vehicle, is capable of traveling with the automated driving function, even though the user does not get in.

The robot vehicle 300 is a self-propelled vehicle having an automated driving function of traveling autonomously in an automated manner. The robot vehicle 300 is a non-riding type vehicle (a second moving body, a third moving body) that does not allow the user to get in, but is capable of traveling on a roadway and a sidewalk. In the present embodiment, the robot vehicle 300 is embodied as a vehicle having a function of supporting the user, a so-called traveling support robot, having, for example, at least one of a function of holding the user's baggage and a function of guiding (for example, leading the way for) the user. The robot vehicle 300 is also capable of holding the user's baggage and following the user, or holding the user's baggage to transport (deliver) to a specific place. In addition, the robot vehicle 300 generally has a vehicle width narrower than the vehicle width of the micro vehicle 200. For this reason, with regard to sidewalks, there are some sidewalks on which the robot vehicle 300 is capable of traveling, but the micro vehicle 200 is not capable of traveling, depending on the width of the sidewalk. Therefore, the range of sidewalks on which the robot vehicle 300 is capable of traveling is broader than the range of the sidewalks on which the micro vehicle 200 is capable of traveling. Accordingly, it is possible to increase the degree of freedom in the movement route of the robot vehicle 300, as compared with the micro vehicle 200. Note that the robot vehicle 300 may be embodied as a drone that functions to support the user described above. Strictly speaking, drones are not vehicles capable of traveling on a roadway or a sidewalk. However, in the present embodiment, the drones are to be included in the robot vehicle 300 in a broad sense that the drones are capable of flying above a roadway and a sidewalk (capable of moving along a roadway and a sidewalk).

The public vehicle 100, the micro vehicle 200, and the robot vehicle 300 each may include, for example, a communication interface (UF) capable of communicating with another device (the outside), such as the communication device 400 or the route guidance device 500, through a network NW.

The communication device 400 is a device that can be carried by a user, and is associated with the user. The communication device 400 includes, for example, a portable terminal such as a smartphone, a tablet terminal, a wearable terminal attachable onto a part of the user's body (for example, a shoulder, a wrist, or the like), and a game machine. In addition, the communication device 400 also includes an in-vehicle navigation device having a communication function, a stationary information terminal installed in a commercial facility, and the like. The communication device 400 includes a processor 410, a memory 420, a communication interface (I/F) 430, a display unit 440, a microphone 450, and a speaker 460. Note that the functions (blocks) to be described below may be integrated or separated, and the functions to be described below may be implemented by different blocks. In addition, a function to be described as hardware may be implemented by software, and vice versa.

The operation of the communication device 400 is implemented, for example, by the processor 410 reading and executing a program stored in the memory 420. By using a communication system such as cellular wireless communication or a wireless LAN, the communication I/F 430 is an interface capable of communicating with another device (the outside), such as the route guidance device 500, through the network NW. The display unit 440 includes a touch panel, displays various user interface screens, and also receives an operation (an instruction) from the user. Upon receiving utterance of the user who owns the communication device 400, the microphone 450 generates voice data (a voice signal) corresponding to the utterance. The speaker 460 outputs sounds to the user who owns the communication device 400 to make a sound notification.

The route guidance device 500 is configured with a general-purpose computer (an information processing device). In the present embodiment, the route guidance device 500 is embodied as a server that manages (controls) the route guidance service in particular in the system 1. The route guidance device 500 includes a processor 510, a memory 520, a communication interface (I/F) 530, and a storage unit 540. Note that the functions (blocks) to be described below may be integrated or separated, and the functions to be described below may be implemented by different blocks. In addition, a function to be described as hardware may be implemented by software, and vice versa.

The operation of the route guidance device 500 is implemented, for example, by the processor 510 reading and executing a program stored in a computer-readable storage medium, such as the memory 520 or the storage unit 540. The communication I/F 530 is an interface capable of communicating with another device (the outside), such as the route guidance device 500, through the network NW. The storage unit 540 stores programs, data, and the like for performing the route guidance service. Examples of the data for performing the route guidance service include data that defines ranges of roads (a roadway, or a roadway and a sidewalk) on which the public vehicle 100, the micro vehicle 200, and the robot vehicle 300 are respectively capable of traveling.

Figure 2:
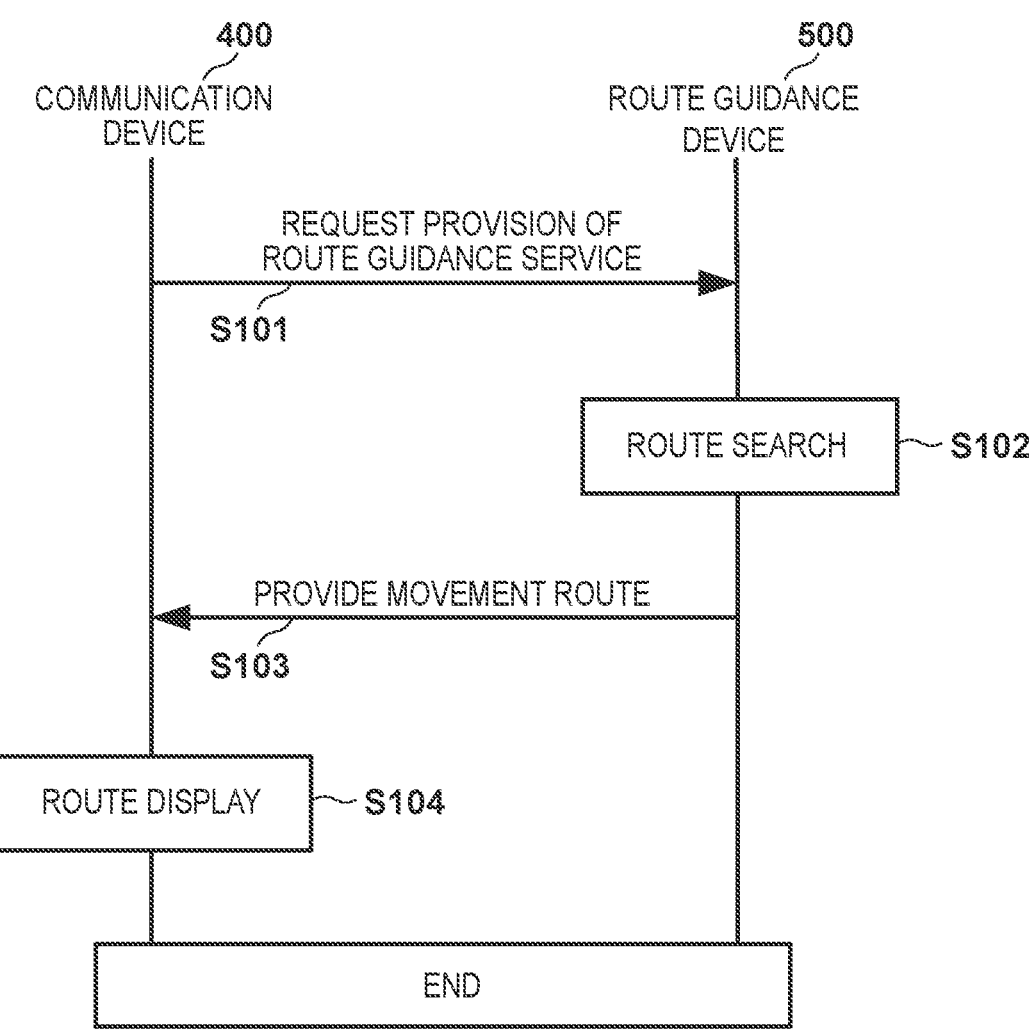
FIG. 2 is a diagram for describing an example of a flow of a route guidance service in the system illustrated in FIG. 1.

The system 1 configured as described above provides the route guidance service. An example of a flow of a route guidance service in the system 1 will be described with reference to FIG. 2.

In S101, the communication device 400 requests the provision of the route guidance service in accordance with an instruction (an operation) of the user. Specifically, the communication device 400 starts up an application from which the user is able to obtain the provision of the route guidance service, supplies the route guidance device 500 with user information including a predetermined ID, a password, and the like to perform user login. Regarding the startup of the application, the application downloaded to the communication device 400 may be started up by a click operation or the like, or the application may be started up by specifying a URL corresponding to the route guidance device 500. The communication device 400 provides a search screen on the application in response that the user login has been performed. The user inputs location information including a departure location of user's movement and a destination location of the user's movement on the search screen. The location information is input by the user designating the departure location and the destination location, respectively. For example, the location information may be input by inputting an address or a name in an input field provided on the search screen, or may be input by designating places respectively corresponding to the departure location and the destination location on a map provided on the search screen. The location information including the departure location and the destination location is input, and then the communication device 400 supplies the route guidance device 500 with the location information to request the provision of the route guidance service.

In S102, the location information is supplied from the communication device 400, and then the route guidance device 500 performs a route search for searching for a movement route from the departure location to the destination location that have been designated by the user. In the route search, for example, a plurality of movement routes respectively corresponding to a plurality of different means of transportation, in the present embodiment, a plurality of movement routes using the public vehicle 100, the micro vehicle 200, and the robot vehicle 300 are respectively searched for.

In S103, the route guidance device 500 provides the communication device 400 with results of the route search, that is, the movement routes from the departure location to the destination location that have been searched for in the route search.

In S104, movement routes from the departure location to the destination location are provided from the route guidance device 500, and then the communication device 400 makes a route display for displaying the movement routes on the display unit 440. Accordingly, the user confirms the movement routes from the departure location to the destination location that have been searched for by the route guidance device 500 with regard to the location information that has been input by the user.

Figure 3:
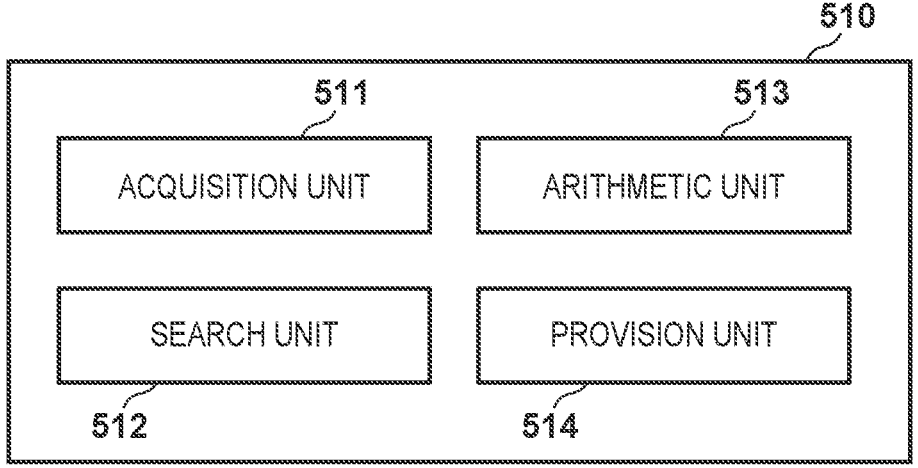
FIG. 3 is a block diagram illustrating an example of a configuration of a processor of the route guidance device illustrated in FIG. 1.

Here, in the present embodiment, in the route search (S103), a technique of promoting use of the micro vehicle 200 (the ultra-compact mobility vehicle) or use of the micro vehicle 200 and the robot vehicle 300 (the traveling support robot) in combination is provided. Specifically, a technique for presenting (providing) usefulness unique to the micro vehicle 200 and the robot vehicle 300 to the user is provided. In order to implement such a technique, the route guidance device 500, in details, the processor 510 includes an acquisition unit 511, a search unit 512, an arithmetic unit 513, and a provision unit 514, as functional blocks as illustrated in FIG. 3. FIG. 3 illustrates an example of a configuration of functional blocks implemented by the processor 510 of the route guidance device 500.

The acquisition unit 511 acquires location information including a departure location and a destination location of the user from the communication device 400 through the communication I/F 530. Note that the departure location and the destination location are basically input by the user on (the search screen provided by) the communication device 400 as described above. However, in a case where the communication device 400 includes a global positioning system (GPS) sensor, the acquisition unit 511 may acquire location information (a current location of the communication device 400) obtained by the GPS sensor, as the departure location.

In addition, the acquisition unit 511 acquires a search condition for the search unit 512 to search for a movement route from the departure location to the destination location of the user, from the communication device 400 through the communication I/F 530. The search condition is input on, for example, a search screen provided by the communication device 400. In this situation, from the viewpoint of usability, a plurality of search conditions are preferably displayed to the user in a selectable manner (that is, so that the user is able to select one search condition from a plurality of search conditions) on the search screen.

The search unit 512 searches for movement routes (a plurality of movement routes) from the departure location to the destination location of the user respectively for the plurality of different means of transportation, based on the location information that has been acquired by the acquisition unit 511. Here, the movement route from the departure location to the destination location denotes not only all the movement route from the departure location to the destination location but also a part of the movement route from the departure location to the destination location. In the present embodiment, the plurality of means of transportation are the public vehicle 100, the micro vehicle 200, and the robot vehicle 300. Thus, the search unit 512 searches for movement routes respectively using the public vehicle 100, the micro vehicle 200, and the robot vehicle 300. Hereinafter, a movement route using the public vehicle 100 will be referred to as a first movement route, a movement route using the micro vehicle 200 will be referred to as a second movement route, and a movement route using the robot vehicle 300 will be referred to as a third movement route, which have been searched for by the search unit 512 The search unit 512 basically searches for the movement routes respectively suitable for the public vehicle 100, the micro vehicle 200, and the robot vehicle 300. However, as described above, the public vehicle 100, the micro vehicle 200, and the robot vehicle 300 have different travelable ranges. Therefore, the first movement route, the second movement route, and the third movement route to be searched for by the search unit 512 are different from one another. In addition, the search unit 512 is capable of searching for a movement route by combining a plurality of different means of transportation in a complex manner. For example, the search unit 512 may search for the movement route by combining the public vehicle 100 with the micro vehicle 200 or combining the public vehicle 100 with the robot vehicle 300. Therefore, the first movement route mainly denotes a movement route using the public vehicle 100, the second movement route mainly denotes a movement route using the micro vehicle 200, and the third movement route mainly denotes a movement route using the robot vehicle 300. Note that any technique known by those skilled in the art is applicable to the search for a movement route by the search unit 512.

Further, in a case where the acquisition unit 511 has acquired the search condition in addition to the location information, the search unit 512 searches for movement routes respectively for the plurality of different means of transportation in accordance with the search condition. For example, the search unit 512 searches for a movement route using each means of transportation so that a way point in accordance with the search condition that has been acquired by the acquisition unit 511 is included in the movement route from the departure location to the destination location (that is, between the departure location and the destination location) of the user. Note that the acquisition unit 511 is also capable of acquiring search conditions respectively for the plurality of different means of transportation (movement routes) (that is, it is possible to acquire search conditions different from one another and set for the respective means of transportation). In such a case, the search unit 512 independently searches for the plurality of movement routes respectively in accordance with the plurality of search conditions (the search conditions different from one another) that have been acquired by the acquisition unit 511.

The arithmetic unit 513 performs an arithmetic operation to obtain a necessary time which is the time necessary for each means of transportation to travel along a movement route from the departure location to the destination location of the user. For example, the arithmetic unit 513 obtains the necessary time by dividing the movement route from the departure location to the destination location of the user by a moving speed (for example, an average speed or a limited speed of each means for transportation) set beforehand for each means of transportation. In the present embodiment, the arithmetic unit 513 performs an arithmetic operation to obtain a necessary time (hereinafter, referred to as "first necessary time") which is the time necessary for the public vehicle 100 to travel along the first movement route that has been searched for by the search unit 512. Similarly, the arithmetic unit 513 performs an arithmetic operation to obtain a necessary time which is the time necessary for the micro vehicle 200 to travel along the second movement route that has been searched for by the search unit 512 (hereinafter, referred to as "second necessary time"). Similarly, the arithmetic unit 513 performs an arithmetic operation to obtain a necessary time which is the time necessary for the robot vehicle 300 to travel along the third movement route that has been searched for by the search unit 512 (hereinafter, referred to as "third necessary time").

In addition, the arithmetic unit 513 is also capable of performing an arithmetic operation to obtain a difference (a necessary time difference) between the first necessary time necessary for the public vehicle 100 to travel along the first movement route and the second necessary time necessary for the micro vehicle 200 to travel along the second movement route.

The provision unit 514 provides the communication device 400 with the movement route (a plurality of movement routes) from the departure location to the destination location of the user that has been searched for by the search unit 512 through the communication I/F 530. In the present embodiment, in order to display each of the plurality of movement routes that have been searched for by the search unit 512 on the display unit 440 included in the communication device 400, the provision unit 514 provides the communication device 400 with each of the plurality of movement routes as display data (image data). Specifically, the provision unit 514 provides the communication device 400 with the display data for displaying each of the plurality of movement routes that have been searched for by the search unit 512 in an identifiable manner.

Further, the provision unit 514 provides, through the communication I/F 530, the communication device 400 with the necessary times and/or necessary time differences that are necessary for the respective means of transportation obtained by the arithmetic operation of the arithmetic unit 513 to travel along the movement routes from the departure location to the destination location of the user. In the present embodiment, the display unit 440 included in the communication device 400 displays the necessary time and/or the necessary time difference that are necessary for the respective means of transportation to travel along the movement routes from the departure location to the destination location of the user. Therefore, the provision unit 514 provides the communication device 400 with the necessary time and/or the necessary time difference as the display data (the image data).

Hereinafter, with reference to FIGS. 4 to 7, a description will be given with regard to the route display (S104) for displaying, on the communication device 400, the movement routes provided from the route guidance device 500

(the provision unit 514) (a plurality of movement routes from the departure location to the destination location of the user that have been searched for by the search unit 512).

Figure 4:
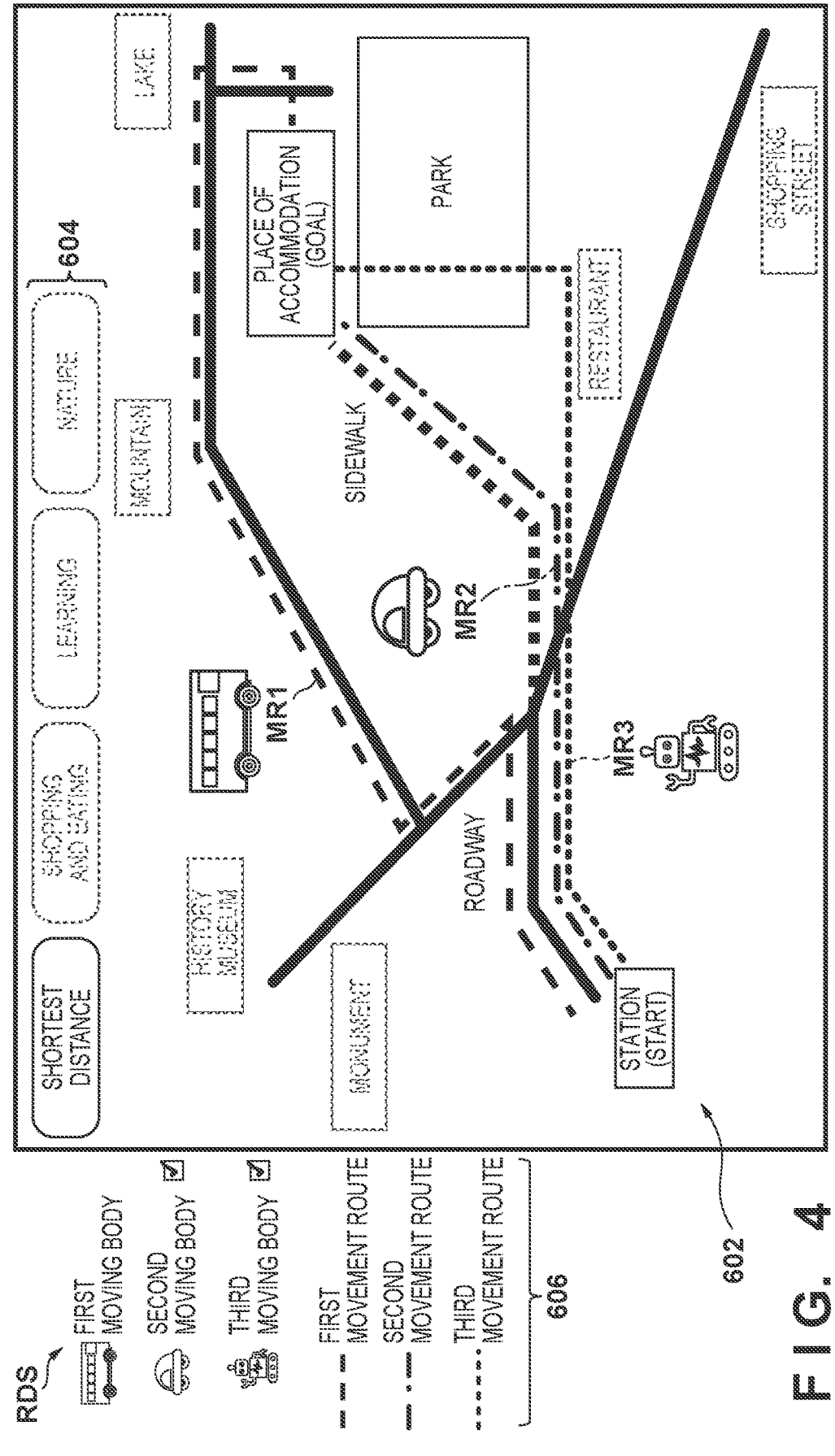
FIG. 4 is a diagram illustrating a specific example of a route display screen displayed on a communication device (a display unit) illustrated in FIG. 1.

FIG. 4 is a diagram illustrating a specific example of a route display screen RDS displayed on the display unit 440 of the communication device 400, in the route display. As illustrated in FIG. 4, the route display screen RDS includes a route display section 602, a condition display section 604, and a correspondence display section 606. Here, it is assumed that a "station (Start)" is designated by the user as the departure location of the user, and "place of accommodation (Goal)" is designated by the user as the destination location.

A plurality of movement routes from the departure location to the destination location of the user that have been searched for by the search unit 512 are displayed on the route display section 602. In FIG. 4, a first movement route MR1 using the public vehicle 100, a second movement route MR2 using the micro vehicle 200, and a third movement route MR3 using the robot vehicle 300 are displayed on the route display section 602. In this manner, in the present embodiment, the first movement route MR1, the second movement route MR2, and the third movement route MR3 are displayed on the route display section 602 (the display unit 440 of the communication device 400). Accordingly, the user is able to recognize the usefulness in a case of using the micro vehicle 200 or the robot vehicle 300, as compared with a case of using the public vehicle 100. This leads to promotion of using the micro vehicle 200 and the robot vehicle 300.

A search condition for the search unit 512 to search for a movement route from the departure location to the destination location of the user is displayed on the condition display section 604. In FIG. 4, as the search conditions, "shortest distance", "shopping and eating", "learning", and "nature" are displayed on the condition display section 604. In addition, in a case where the search condition (in FIG. 4, "shortest distance") that has been selected by the user on the search screen is displayed to be identifiable on the condition display section 604. However, in a case where the user does not select the search condition, for example, "shortest distance" is selected as an initial setting. Note that also on the condition display section 604, "shortest distance", "shopping and eating", "learning", and "nature" (a plurality of search conditions) may be displayed to the user in a selectable manner. Accordingly, the user is able to input (select) the search condition on the condition display section 604 (the route display screen RDS provided by the communication device 400), and thus the user is able to easily change the search condition in accordance with a user's own request (intention). Therefore, the usability can be improved.

Note that in FIG. 4, as described above, the "shortest distance" is selected as the search condition. Thus, the search unit 512 searches for the movement routes respectively for the public vehicle 100, the micro vehicle 200, and the robot vehicle 300, so that the distance of the movement route from the departure location to the destination location of the user becomes the shortest distance. Therefore, the first movement route MR1 displayed on the route display section 602 is the shortest movement route, in the case of using the public vehicle 100. Similarly, the second movement route MR2 and the third movement route MR3 displayed on the route display section 602 are respectively the shortest movement routes, in the cases of using the micro vehicle 200 and the robot vehicle 300 respectively. Accordingly, the user is able to easily grasp the shortest movement routes, in the case of using the public vehicle 100, in the case of using the micro vehicle 200, and in the case of using the robot vehicle 300.

The correspondence between the movement routes (line diagrams) displayed on the route display section 602 and various means of transportation (schematic diagrams) are displayed on the correspondence display section 606. In FIG. 4, the respective schematic diagrams of the public vehicle 100, the micro vehicle 200, and the robot vehicle 300 and the correspondence with the first movement route MR1, the second movement route MR2, and the third movement route MR3 are respectively displayed on the correspondence display section 606. Accordingly, the user is able to easily grasp the first movement route MR1, the second movement route MR2, and the third movement route MR3 respectively displayed on the route display section 602.

Note that in FIG. 4, both the second movement route MR2 using the micro vehicle 200 and the third movement route MR3 using the robot vehicle 300 are displayed on the route display section 602, in contrast to the first movement route MR1 using the public vehicle 100. However, only one of the second movement route MR2 and the third movement route MR3 may be displayed on the route display section 602, in contrast to the first movement route MR1. The selection of the movement route to be displayed on the route display section 602 is enabled, for example, by the provision of icons, for example, check boxes for respectively selecting the micro vehicle 200 and the robot vehicle 300 displayed on the correspondence display section 606, as illustrated in FIG. 4.

In addition, in FIG. 4, only the first movement route MR1 using the public vehicle 100, the second movement route MR2 using the micro vehicle 200, and the third movement route MR3 using the robot vehicle 300 are displayed on the route display section 602. However, in addition to each movement route, the necessary time which is the time necessary for each means of transportation to travel along each movement route obtained by the arithmetic operation of the arithmetic unit 513 may be displayed on the route display section 602. Specifically, the first necessary time (for example, "necessary time: 30 minutes" or the like) which is the time necessary for the public vehicle 100 to travel along the first movement route MR1 is displayed to be adjacent to or to be superimposed on the first movement route MR1. Similarly, the second necessary time (for example, "necessary time: 25 minutes", or the like) which is the time necessary for the micro vehicle 200 to travel along the second movement route MR2 is displayed to be adjacent to or to be superimposed on the second movement route MR2. Accordingly, the user is able to easily grasp the necessary time in the case of using the public vehicle 100 and the necessary time in the case of using the micro vehicle 200.

Furthermore, in addition to each movement route and each necessary time, a necessary time difference obtained by the arithmetic operation of the arithmetic unit 513 may be displayed on the route display section 602. Specifically, the necessary time difference, which is a difference between the first necessary time necessary for the public vehicle 100 to travel along the first movement route and the second necessary time necessary for the micro vehicle 200 to travel along the second movement route, is displayed on route display section 602. Accordingly, the user is able to easily grasp the necessary time difference between the case of using the public vehicle 100 and the case of using the micro vehicle 200. Therefore, for example, the user is able to easily grasp whether the user can reach the destination location earlier by using the public vehicle 100 or can reach the destination location earlier by using the micro vehicle 200.

FIG. 5 is a diagram illustrating another specific example of the route display screen RDS displayed on the display unit 440 of the communication device 400, in the route display. Referring to the condition display section 604, in FIG. 5, the "shopping and eating" is selected as the search condition. Therefore, the search unit 512 searches for the movement routes respectively for the public vehicle 100, the micro vehicle 200, and the robot vehicle 300 so that the movement route from the departure location to the destination location of the user becomes a movement route suitable for the "shopping and eating". For example, the search unit 512 searches for a movement route so that a way point corresponding to the "shopping and eating" that is the search condition is included in the movement route from the departure location to the destination location of the user. In the present embodiment, the first movement route MR1 and the second movement route MR2 are searched for so that a "shopping street" and a "restaurant" corresponding to the "shopping and eating" are included in the respective movement routes using the public vehicle 100 and the micro vehicle 200. In addition, the third movement route MR3 is searched for so that a "shopping street" corresponding to the "shopping and eating" is included in the movement route using the robot vehicle 300. Thus, the first movement route MR1 and the second movement route MR2 each including "shopping street" and "restaurant" between the departure location and the destination location are displayed, and the third movement route MR3 including "shopping street" between the departure location and the destination location is displayed on the route display section 602. Accordingly, the user is able to recognize the usefulness in accordance with the search condition in the case of using the micro vehicle 200 or the robot vehicle 300, as compared with the case of using the public vehicle 100. Note that here, it is assumed that the robot vehicle 300 is used to deliver the user's baggage (for example, a product purchased in a "shopping street") to the destination location, and only a "shopping street" is included in the third movement route MR3. Therefore, the robot vehicle 300 departs from the "station", by way of only the "shopping street" (without passing near the "restaurant"), and travels toward the "place of accommodation" in order to carry the baggage earlier than the user. On the other hand, the micro vehicle 200 departs from the "station" by way of the "shopping street" and the "restaurant", and travels toward the "place of accommodation". In this manner, the third movement route MR3 using the robot vehicle 300 is different from the second movement route MR2 using the micro vehicle 200. However, in a case where the robot vehicle 300 is used to hold the user's baggage following the user, it is sufficient to include the "restaurant" in the third movement route MR3. In this case, the third movement route MR3 using the robot vehicle 300 is the same with the second movement route MR2 using the micro vehicle 200.

Figure 6:
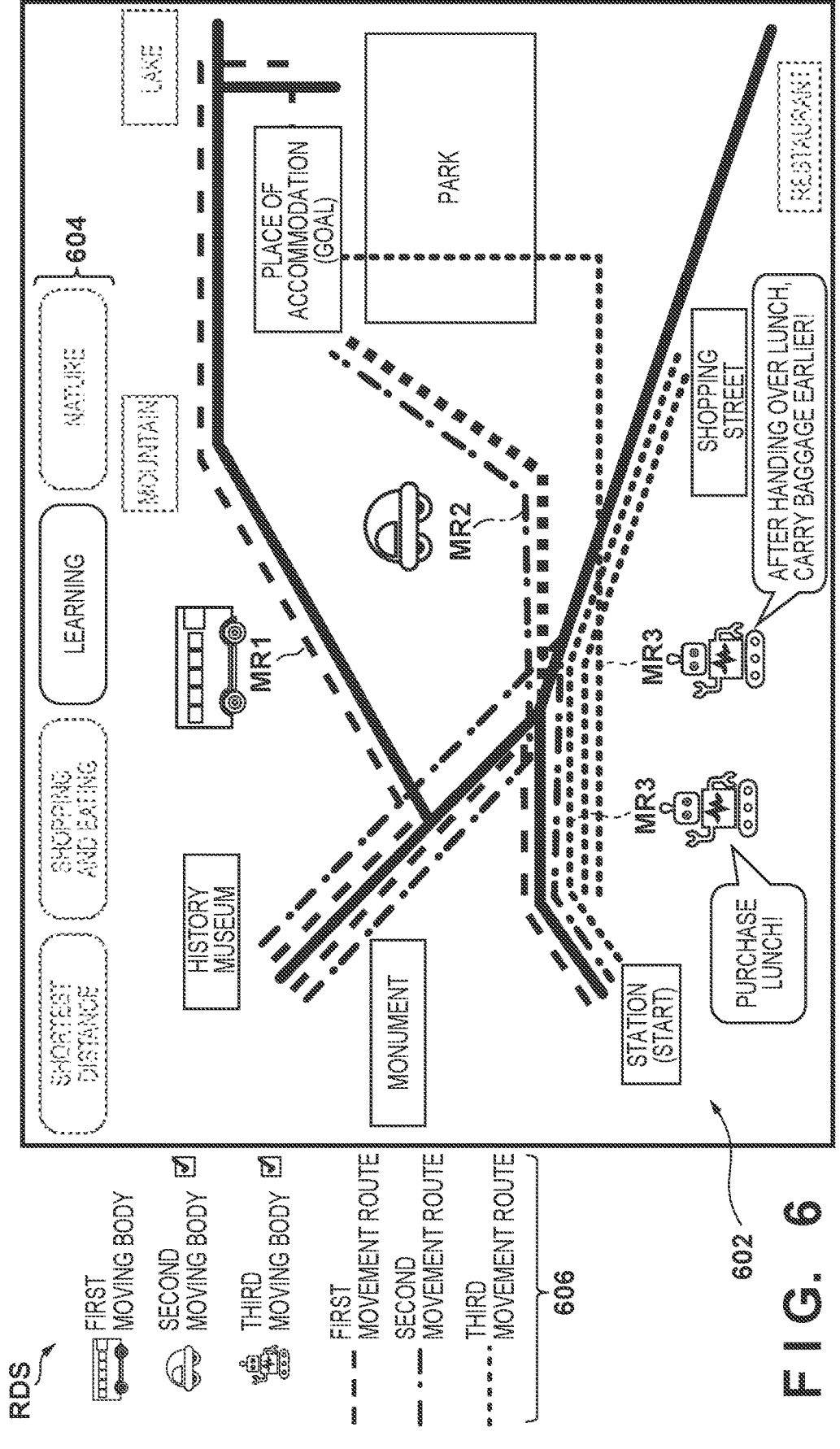
FIG. 6 is a diagram illustrating still another specific example of the route display screen displayed on the communication device (the display unit) illustrated in FIG. 1.

FIG. 6 is a diagram illustrating still another specific example of the route display screen RDS displayed on the display unit 440 of the communication device 400, in the route display. Referring to the condition display section 604, in FIG. 6, the "learning" is selected as the search condition. Therefore, the search unit 512 searches for the movement routes respectively for the public vehicle 100, the micro vehicle 200, and the robot vehicle 300 so that the movement route from the departure location to the destination location of the user becomes a movement route suitable for the "learning". For example, the search unit 512 searches for a movement route so that a way point corresponding to the "learning" that is the search condition is included in the movement route from the departure location to the destination location of the user. In the present embodiment, the first movement route MR1 and the second movement route MR2 are searched for so that a "monument" and a "history museum" corresponding to the "learning" are included in the movement routes respectively using the public vehicle 100 and the micro vehicle 200.

On the other hand, as described above, it is assumed that the robot vehicle 300 is used to deliver the user's baggage to the destination location, and baggage to be carried by the robot vehicle 300 is not newly generated in the "monument" or the "history museum". In such a case, the movement route using the robot vehicle 300 does not have to include the "monument" or the "history museum" corresponding to the "learning". Therefore, for the robot vehicle 300, the search condition may be set to the "shortest distance", and the movement route is desirably searched for so that the distance of the movement route from the departure location to the destination location of the user becomes the shortest distance. In this manner, it is possible to independently select the search condition for the micro vehicle 200 and the search condition for the robot vehicle 300 (that is, the search condition is set for every means of transportation). Accordingly, the user is able to use the micro vehicle 200 or the robot vehicle 300, while obtaining the usefulness unique to the micro vehicle 200 and the robot vehicle 300 respectively.

In addition, as illustrated in FIG. 6, the third movement route MR3 of the robot vehicle 300 may be searched for so that a way point corresponding to the current time is included in the movement route. For example, it is assumed that the current time is lunch time (around noon), the user is likely to need lunch before going to the "monument" or the "history museum". Thus, the third movement route MR3 is searched for so that a "shopping street" (purchase of lunch in a shopping street) corresponding to the current time is included in the movement route using the robot vehicle 300, and the lunch purchased in the "shopping street" is carried (delivered) to the user as baggage. Therefore, the robot vehicle 300 departs from the "station", purchases lunch by way of the "shopping street", and travels toward (the current location of) the "user" to carry the lunch to the user. Accordingly, the user is able to recognize the usefulness in accordance with the current time, in the case of using the robot vehicle 300.

Note that with regard to not only the robot vehicle 300 but also the public vehicle 100 and the micro vehicle 200, it is also possible to search for the first movement route MR1 and the second movement route MR2 so that a way point corresponding to the current time is included in the movement route. In this case, the user is able to recognize the usefulness in accordance with the current time in the case of using the micro vehicle 200 (or the robot vehicle 300), as compared with the case of using the public vehicle 100.

Figure 7:
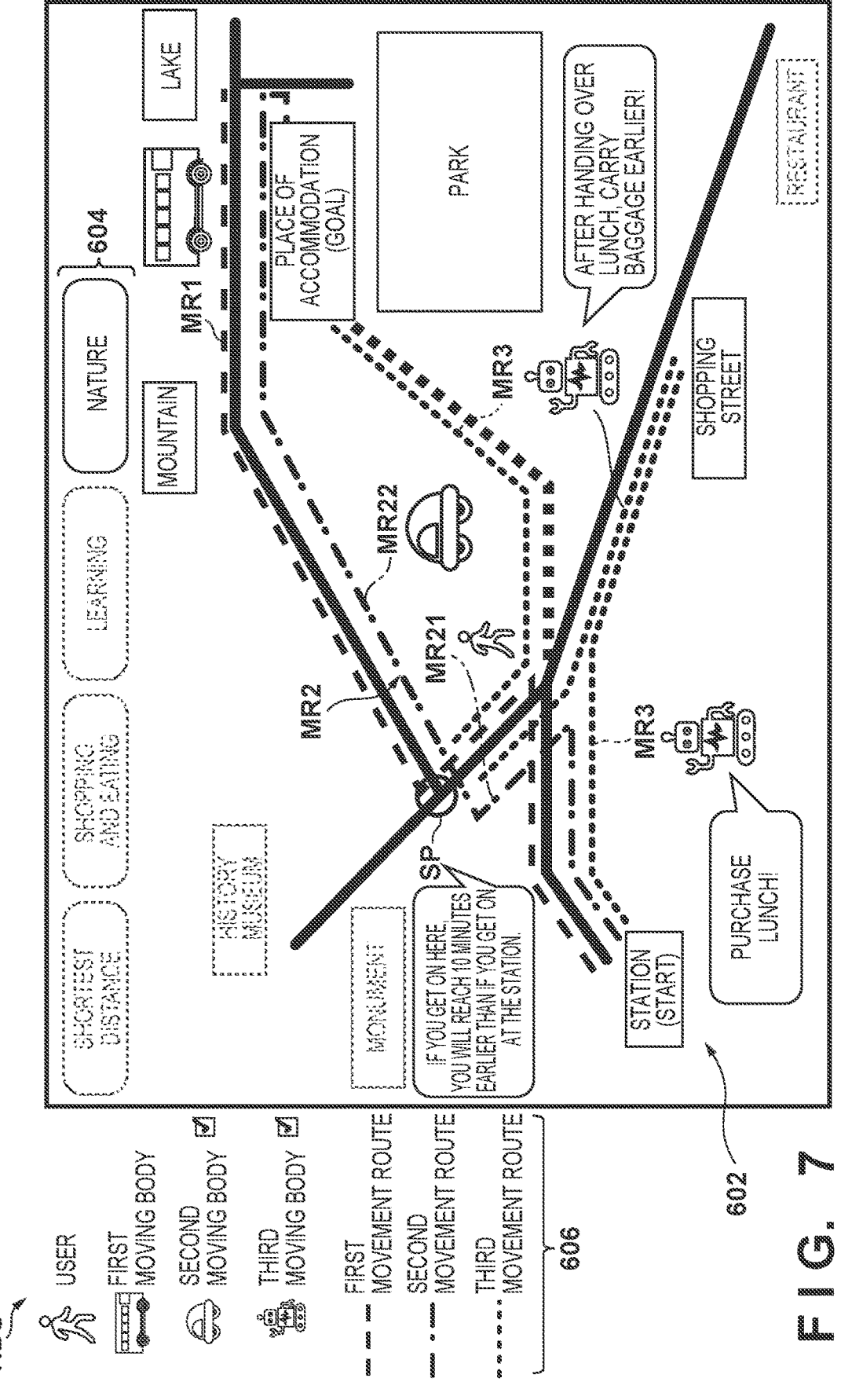
FIG. 7 is a diagram illustrating further another specific example of the route display screen displayed on the communication device (the display unit) illustrated in FIG. 1.

FIG. 7 is a diagram illustrating further another specific example of the route display screen RDS displayed on the display unit 440 of the communication device 400, in the route display. Referring to the condition display section 604, in FIG. 7, "natural" is selected as the search condition. Therefore, the search unit 512 searches for the movement routes respectively for the public vehicle 100 and the micro vehicle 200 so that the movement route from the departure location to the destination location of the user becomes a movement route suitable for the "nature". For example, the search unit 512 searches for a movement route so that a way point corresponding to the "nature" that is the search condition is included in the movement route from the departure location to the destination location of the user. In the present embodiment, the first movement route MR1 and the second movement route MR2 are searched for so that a "mountain" and a "lake" corresponding to the "nature" are included in each of the movement routes using the public vehicle 100 and the micro vehicle 200.

Here, as illustrated in FIG. 7, the second movement route MR2 using the micro vehicle 200 may be a combination of a movement route MR21 using walking of the user and a movement route MR22 using the micro vehicle 200. For example, there is also a conceivable case where the user is able to reach the "place of accommodation" (the destination location) earlier by getting in the micro vehicle 200 in a transit location SP, which is a location different from the "station", than by getting in the micro vehicle 200 at the "station" (the departure location). In such a case, the second movement route MR2 is desirably searched for so that the movement route MR21 using walking of the user is included in a route from the "station" to the transit location SP, and the movement route MR22 using the micro vehicle 200 is included in a route from the transit location SP to the "place of accommodation" (the "mountain" and the "lake"). Accordingly, the user is able to further recognize the usefulness in the case of using the micro vehicle 200.

Note that in FIG. 7, the description has been given with regard to the combination of the movement route MR21 using walking of the user and the movement route MR22 using the micro vehicle 200 as the second movement route MR2, but there is no intention of limiting to this. For example, a combination of the movement route using the public vehicle 100 and the movement route using the micro vehicle 200 may be used as the second movement route MR2 using the micro vehicle 200. Similarly, a combination of the movement route using the public vehicle 100 and the movement route using the robot vehicle 300 may be used as the third movement route MR3. In addition, the transit location SP may be any location different from the departure location or the destination location, and may be, for example, any of the above-described various way points.

In addition, in a case where the user selects the second movement route MR2 including the movement route MR21 and the movement route MR22 on the route display screen RDS, a reservation instruction of the micro vehicle 200 is preferably transmitted from the communication device 400 to the route guidance device 500. The reservation instruction of the micro vehicle 200 is an instruction for dispatching the micro vehicle 200 to the transit location SP. Accordingly, the usability can be improved, and the use of the micro vehicle 200 can be promoted. Note that a selection button for selecting a movement route displayed on the route display section 602 is provided, for example, on the correspondence display section 606. The user presses the selection button, and then the reservation instruction for the micro vehicle 200 is enabled.

In addition, as illustrated in FIG. 7, the third movement route MR3 of the robot vehicle 300 may be searched for so that a way point corresponding to the current time is included in the movement route. For example, it is assumed that the current time is lunch time (around noon), the user is likely to need lunch as described above. Thus, the third movement route MR3 is searched for so that a "shopping street" (purchase of lunch in a shopping street) corresponding to the current time is included in the movement route using the robot vehicle 300, and the lunch purchased in the "shopping street" is carried (delivered) as the baggage to, for example, the transit location SP. Therefore, the robot vehicle 300 departs from the "station", purchases lunch by way of the "shopping street", and travels toward the transit location SP to carry the lunch to the user.

As described heretofore, according to the system 1, the technique of promoting the use of the micro vehicle 200 (the ultra-compact mobility vehicle) or the use of the micro vehicle 200 and the robot vehicle 300 (the traveling support robot) in combination can be provided. Specifically, the system 1 is capable of providing the technique of presenting (supplying) usefulness unique to the micro vehicle 200 and the robot vehicle 300 to the user.

In the present embodiment, the system 1 that provides the route guidance service has been described as an example, but the present invention is not limited to this. For example, the route guidance device 500 alone constitutes one aspect of the present invention. In addition, a program for operating the communication device 400, specifically, a program for causing the communication device 400 to function as an acquisition unit, a transmission unit, a reception unit, and a display unit also constitutes one aspect of the present invention. The acquisition unit in the communication device 400 has a function of acquiring location information including a departure location and a destination location of the user, and is implemented by, for example, the display unit 440 (the touch panel), the microphone 450, and the like. The transmission unit in the communication device 400 has a function of transmitting the location information that has been acquired by the acquisition unit to the route guidance device 500, and is implemented by, for example, the communication I/F 430 or the like. The reception unit in the communication device 400 has a function of receiving a plurality of movement routes that have been searched for, based on the location information, from the route guidance device 500, and is implemented by, for example, the communication I/F 430 or the like. The display unit in the communication device 400 has a function of displaying a plurality of movement routes that have been received by the reception unit, and is implemented by, for example, the display unit 440 or the like.

Summary of Embodiments

[Item 1] A route guidance device according to the above-described embodiments is:

a route guidance device (for example, 500) that guides a user along a movement route, the route guidance device including:

an acquisition unit (for example, 510, 511) configured to acquire, from a communication device (for example, 400), location information including a departure location and a destination location of the user;

a search unit (for example, 510, 512) configured to search for a plurality of movement routes (for example, MR1, MR2, MR3) from the departure location to the destination location, based on the location information acquired by the acquisition unit; and a provision unit (for example, 510, 514) configured to provide the communication device with the plurality of movement routes searched for by the search unit, wherein the plurality of movement routes includes:

a first movement route (for example, MR1) using a first moving body (for example, 100) of a riding type capable of traveling on a roadway; and a second movement route (for example, MR2, MR3) using a second moving body (for example, 200, 300) of a self-propelled type capable of traveling on a sidewalk.

According to this embodiment, the user is able to recognize the usefulness in the case of using the second moving body, as compared with the case of using the first moving body.

[Item 2] In the above-described route guidance device, wherein the second moving body (for example, 200) is a non-riding type vehicle.

According to this embodiment, an ultra-compact mobility vehicle (a micro mobility vehicle) can be used as the second moving body.

[Item 3] In the above-described route guidance device, wherein the second moving body (for example, 300) is a non-riding type vehicle.

According to this embodiment, a traveling support robot can be used as the second moving body.

[Item 4] In the above-described route guidance device, wherein the plurality of movement routes (for example, MR1, MR2, MR3) include a third movement route (for example, MR3) using a third moving body (for example, 300) of the self-propelled type capable of traveling on the sidewalk, the second moving body (for example, 200) is a riding type vehicle, and the third moving body is a non-riding type vehicle.

According to this embodiment, the ultra-compact mobility vehicle can be used as the second moving body, and the traveling support robot can be used as the third moving body.

[Item 5] In the above-described route guidance device, wherein the third moving body (for example, 300) is a vehicle having at least one of a function of holding baggage of the user and a function of guiding the user to the destination location.

According to this embodiment, the traveling support robot having a function of holding baggage of the user and a function of guiding the user to a destination location can be used as the third moving body.

[Item 6] In the above-described route guidance device, wherein a range of the sidewalk on which the third moving body (for example, 300) is capable of traveling is broader than a range of the sidewalk on which the second moving body (for example, 200) is capable of traveling.

According to this embodiment, the degree of freedom in the movement route can be improved for the third moving body, as compared with the second moving body.

[Item 7] In the above-described route guidance device, wherein the provision unit (for example, 514) provides the communication device (for example, 400) with data for displaying each of the plurality of movement routes (for example, MR1, MR2, MR3) searched for by the search unit (for example, 512) in an identifiable manner on a display unit (for example, 440) included in the communication device.

According to this embodiment, it becomes possible to display the plurality of movement routes that have been searched for by the search unit in an identifiable manner on the display unit included in the communication device.

[Item 8] In the above-described route guidance device, further comprising an arithmetic unit (for example, 513) configured to perform an arithmetic operation to obtain a first necessary time which is a time necessary for the first moving body (for example, 100) to travel along the first movement route (for example, MR1) and a second necessary time which is a time necessary for the second moving body (for example, 200, 300) to travel along the second movement route (for example, MR2), wherein the provision unit (for example, 514) provides the communication device (for example, 400) with the first necessary time and the second necessary time respectively obtained by the arithmetic operation of the arithmetic unit.

According to this embodiment, the user is able to easily grasp the necessary time in the case of using the first moving body and the necessary time in the case of using the second moving body.

[Item 9] In the above-described route guidance device, wherein the arithmetic unit (for example, 513) performs the arithmetic operation to obtain a difference between the first necessary time and the second necessary time, and the provision unit (for example, 514) provides the communication device (for example, 400) with the difference obtained by the arithmetic operation of the arithmetic unit.

According to this embodiment, the user is able to easily grasp the necessary time difference between the case of using the first moving body and the case of using the second moving body.

[Item 10] In the above-described route guidance device, wherein the search unit (for example, 512) searches for the first movement route (for example, MR1) and the second movement route (for example, MR2) such that a distance of the movement route from the departure location to the destination location is a shortest distance.

According to this embodiment, the user is able to easily grasp the shortest movement route in each case of using the first moving body and the second moving body.

[Item 11] In the above-described route guidance device, wherein the acquisition unit (for example, 511) acquires, from the communication device (for example, 400), a search condition for searching for the movement route from the departure location to the destination location, and the search unit (for example, 512) searches for the plurality of movement routes (for example, MR1, MR2, MR3) in accordance with the search condition acquired by the acquisition unit.

According to this embodiment, it becomes possible to search for a movement route in accordance with a search condition.

[Item 12] In the above-described route guidance device, wherein the search unit (for example, 512) searches for the plurality of movement routes (for example, MR1, MR2, MR3) such that a way point corresponding to the search condition is included in the movement route from the departure location to the destination location.

According to this embodiment, it becomes possible to search for a movement route including a way point corresponding to the search condition.

[Item 13] In the above-described route guidance device, wherein the acquisition unit (for example, 511) acquires, from the communication device (for example, 400), a plurality of search conditions for respectively searching for the plurality of movement routes (for example, MR1, MR2, MR3), and the search unit (for example, 512) respectively searches for the plurality of movement routes independently in accordance with each of the plurality of search conditions acquired by the acquisition unit.

According to this embodiment, as the plurality of movement routes, it becomes possible to search for a movement route in accordance with the search condition independently.

[Item 14] In the above-described route guidance device, wherein the search unit (for example, 512) searches for the plurality of movement routes (for example, MR1, MR2, MR3) such that a way point in accordance with a current time is included in the movement route from the departure location to the destination location.

According to this embodiment, it becomes possible to search for a movement route including the way point corresponding to the current time.

[Item 15] In the above-described route guidance device, wherein the second movement route (for example, MR2) is a combination of the movement route (for example, MR21) using walking of the user and a movement route (for example, MR22) using the second moving body (for example, 200, 300).

According to this embodiment, the user is able to further recognize the usefulness in the case of using the second moving body.

[Item 16] A system according to the above-described embodiments is:

a system (for example, 1) including a route guidance device (for example, 500) configured to guide a user along a movement route, and a communication device (for example, 400) capable of communicating with the route guidance device, the system including:

an acquisition unit (for example, 511) configured to acquire, from the communication device, location information including a departure location and a destination location of the user;

a search unit (for example, 512) configured to search for a plurality of movement routes (for example, MR1, MR2, MR3) from the departure location to the destination location, based on the location information acquired by the acquisition unit; and a provision unit (for example, 514) configured to provide the communication device with the plurality of movement routes searched for by the search unit, wherein the plurality of movement routes includes:

a first movement route (for example, MR1) using a first moving body (for example, 100) of a riding type capable of traveling on a roadway; and a second movement route (for example, MR2, MR3) using a second moving body (for example, 200, 300) of a self-propelled type capable of traveling on a sidewalk.

According to this embodiment, the user is able to recognize the usefulness in the case of using the second moving body, as compared with the case of using the first moving body.

[Item 17] A route guidance method according to the above-described embodiments is:

a route guidance method for guiding a user along a movement route, the method including:

a first step of acquiring, from a communication device (for example, 400), location information including a departure location and a destination location of the user;

a second step of searching for a plurality of movement routes (for example, MR1, MR2, MR3) from the departure location to the destination location, based on the location information acquired in the first step; and a third step of providing the communication device with the plurality of movement routes searched for in the second step, wherein the plurality of movement routes includes:

a first movement route (for example, MR1) using a first moving body (for example, 100) of a riding type capable of traveling on a roadway; and a second movement route (for example, MR2, MR3) using a second moving body (for example, 200) of a self-propelled type capable of traveling on a sidewalk.

According to this embodiment, the user is able to recognize the usefulness in the case of using the second moving body, as compared with the case of using the first moving body.

[Item 18] A storage medium according to the above-described embodiments is:

a storage medium for causing a communication device (for example, 400) capable of communicating with a route guidance device (for example, 500) that guides a user along a movement route to function as:

an acquisition unit (for example, 440, 450) configured to acquire location information including a departure location and a destination location of the user;

a transmission unit (for example, 430) configured to transmit, to the route guidance device, the location information acquired by the acquisition unit;

a reception unit (for example, 430) configured to receive a plurality of movement routes (for example, MR1, MR2, MR3) from the departure location to the destination location searched for, based on the location information; and a display unit (for example, 440) configured to display the plurality of movement routes received by the reception unit, wherein the plurality of movement routes includes:

a first movement route (for example, MR1) using a first moving body (for example, 100) of a riding type capable of traveling on a roadway; and a second movement route (for example, MR2, MR3) using a second moving body (for example, 200) of a self-propelled type capable of traveling on a sidewalk.

According to this embodiment, the user is able to recognize the usefulness in the case of using the second moving body, as compared with the case of using the first moving body.

[Item 19] In the above-described storage medium, wherein the second moving body (for example, 200) is a riding type vehicle, and in a case where the user selects the second movement route (for example, MR2), the transmission unit (for example, 430) transmits a reservation instruction of the second moving body to the route guidance device (for example, 500).

According to this embodiment, the usability can be improved, and the use of the second moving body can be promoted.

The invention is not limited to the foregoing embodiments, and various variations/changes are possible within the spirit of the invention.

What is claimed is:

1. A route guidance device that guides a user along a movement route, the route guidance device comprising:

one or more processors; and a memory storing instructions which, when executed by the one or more processors, cause the one or more processors to:

acquire, from a communication device, location information including a departure location and a destination location of the user;

search for a plurality of movement routes from the departure location to the destination location, based on the acquired location information; and provide the communication device with the searched plurality of movement routes, wherein each of the plurality of movement routes includes the departure location and the destination location designated by the user, and the plurality of movement routes includes:

a first movement route using a first moving body of a riding type capable of traveling on a roadway; and a second movement route using a second moving body of a self-propelled type capable of traveling on a sidewalk, the instructions further cause the one or more processors to:

search the plurality of movement routes in consideration of different traveling range capabilities of the first moving body and the second moving body, perform an arithmetic operation to obtain a first time which is a time for the first moving body to travel along the first movement route, a second time which is a time for the second moving body to travel along the second movement route, and a difference between the first time and the second time, simultaneously provide the first movement route and the second movement route, together with the first time, the second time, and the difference, in an identifiable manner on a display of the communication device; and causing at least one of the first moving body and the second moving body to travel along the first or second movement routes, respectively, upon selection of the first or second movement routes on the display of the communication device.

2. The route guidance device according to claim 1, wherein the second moving body is a riding type vehicle.

3. The route guidance device according to claim 1, wherein the second moving body is a non-riding type vehicle.

4. The route guidance device according to claim 1, wherein the plurality of movement routes include a third movement route using a third moving body of the self-propelled type capable of traveling on the sidewalk, the second moving body is a riding type vehicle, and the third moving body is a non-riding type vehicle.

5. The route guidance device according to claim 4, wherein the third moving body is a vehicle having at least one of a function of holding baggage of the user and a function of guiding the user to the destination location.

6. The route guidance device according to claim 4, wherein a range of the sidewalk on which the third moving body is capable of traveling is broader than a range of the sidewalk on which the second moving body is capable of traveling.

7. The route guidance device according to claim 1, wherein the instructions cause the one or more processors to provide the communication device with data for displaying the first movement route and the second movement route, together with the first time, the second time, and the difference, in an identifiable manner on the display of the communication device.

8. The route guidance device according to claim 1, wherein the instructions cause the one or more processors to search for the first movement route and the second movement route such that a distance of the movement route from the departure location to the destination location is a shortest distance.

9. The route guidance device according to claim 1, wherein the instructions cause the one or more processors to:

acquire, from the communication device, a search condition for searching for the movement route from the departure location to the destination location; and search for the plurality of movement routes in accordance with the acquired search condition.

10. The route guidance device according to claim 9, wherein the instructions cause the one or more processors to search for the plurality of movement routes such that a way point corresponding to the search condition is included in the movement route from the departure location to the destination location.

11. The route guidance device according to claim 1, wherein the instructions cause the one or more processors to:

acquire, from the communication device, a plurality of search conditions for respectively searching for the plurality of movement routes; and search for the plurality of movement routes independently in accordance with each of the acquired plurality of search conditions.

12. The route guidance device according to claim 1, wherein the instructions cause the one or more processors to search for the plurality of movement routes such that a way point in accordance with a current time is included in the movement route from the departure location to the destination location.

13. The route guidance device according to claim 1, wherein the second movement route is a combination of the movement route using walking of the user and a movement route using the second moving body.

14. A system comprising a route guidance device configured to guide a user along a movement route, and a communication device capable of communicating with the route guidance device, the route guidance device comprising:

one or more processors; and a memory storing instructions which, when executed by the one or more processors, cause the one or more processors to:

acquire, from the communication device, location information including a departure location and a destination location of the user;

search for a plurality of movement routes from the departure location to the destination location, based on the acquired location information; and provide the communication device with the searched plurality of movement routes, wherein each of the plurality of movement routes includes the departure location and the destination location designated by the user, and the plurality of movement routes includes:

a first movement route using a first moving body of a riding type capable of traveling on a roadway; and a second movement route using a second moving body of a self-propelled type capable of traveling on a sidewalk, the instructions further cause the one or more processors to:

search the plurality of movement routes in consideration of different traveling range capabilities of the first moving body and the second moving body, perform an arithmetic operation to obtain a first time which is a time for the first moving body to travel along the first movement route, a second time which is a time for the second moving body to travel along the second movement route, and a difference between the first time and the second time, simultaneously provide the first movement route and the second movement route, together with the first time, the second time, and the difference, in an identifiable manner on a display of the communication device; and causing at least one of the first moving body and the second moving body to travel along the first or second movement routes, respectively, upon selection of the first or second movement routes on the display of the communication device.

15. A route guidance method for guiding a user along a movement route, the method comprising:

acquiring, from a communication device, location information including a departure location and a destination location of the user;

searching for a plurality of movement routes from the departure location to the destination location, based on the acquired location information;

providing the communication device with the plurality of movement routes from the searching, wherein each of the plurality movement routes includes the departure location and the destination location designated by the user, and the plurality of movement routes includes:

a first movement route using a first moving body of a riding type capable of traveling on a roadway; and a second movement route using a second moving body of a self-propelled type capable of traveling on a sidewalk; and the method further comprising:

searching the plurality of movement routes in consideration of different traveling range capabilities of the first moving body and the second moving body, performing an arithmetic operation to obtain a first time which is a time for the first moving body to travel along the first movement route, a second time which is a time for the second moving body to travel along the second movement route, and a difference between the first time and the second time, simultaneously providing the first movement route and the second movement route, together with the first time, the second time, and the difference, in an identifiable manner on a display of the communication device; and causing at least one of the first moving body and the second moving body to travel along the first or second movement routes, respectively, upon selection of the first or second movement routes on the display of the communication device.

* * * * *